United States Patent [19]
Cook

[11] 3,894,904
[45] July 15, 1975

[54] METHOD OF MANUFACTURING SYNTHETIC PAPER LAMINATES

[75] Inventor: Stephen O. Cook, Mill Valley, Calif.

[73] Assignee: Crown Zellerbach Corporation, San Francisco, Calif.

[22] Filed: June 11, 1973

[21] Appl. No.: 368,746

[52] U.S. Cl. ............. 156/229; 156/306; 156/307; 264/210 R; 264/288; 264/289; 264/DIG. 47; 161/402
[51] Int. Cl............................................. B32b 31/16
[58] Field of Search............... 156/229, 306, 307; 264/288, 289, 210 R, DIG. 47; 161/162, 402

[56] References Cited
UNITED STATES PATENTS
3,765,999  10/1973  Toyoda .............................. 156/229
3,790,435  2/1974  Tanba et al. ....................... 156/229

Primary Examiner—William J. Van Balen
Attorney, Agent, or Firm—Stanley Bialos; Corwin R. Horton; Thomas R. Lampe

[57] ABSTRACT

Synthetic paper comprises a laminate of at least three layers bonded together, one layer being a fractured, unidirectionally or uniaxially stretched, thermoplastic resin containing minute particles of an inorganic filler and microvoids between the resin and filler providing a printing surface. A bonding layer adhered to the inorganic filler-containing layer is of tough, unfractured, unidirectionally or uniaxially stretched, thermoplastic film and provides an intermediate layer which is bonded to a foundation sheet or layer providing support and imparting strength to the laminate. The microvoids in the inorganic filler-containing layer are formed by first providing a bilaminate of the inorganic filler-containing layer and the intermediate layer and stretching both layers simultaneously in only one direction (the machine direction), after which the foundation sheet is bonded to the intermediate layer. Thus, tentering apparatus for stretching the laminate in a direction transverse to the machine direction is obviated.

7 Claims, 5 Drawing Figures

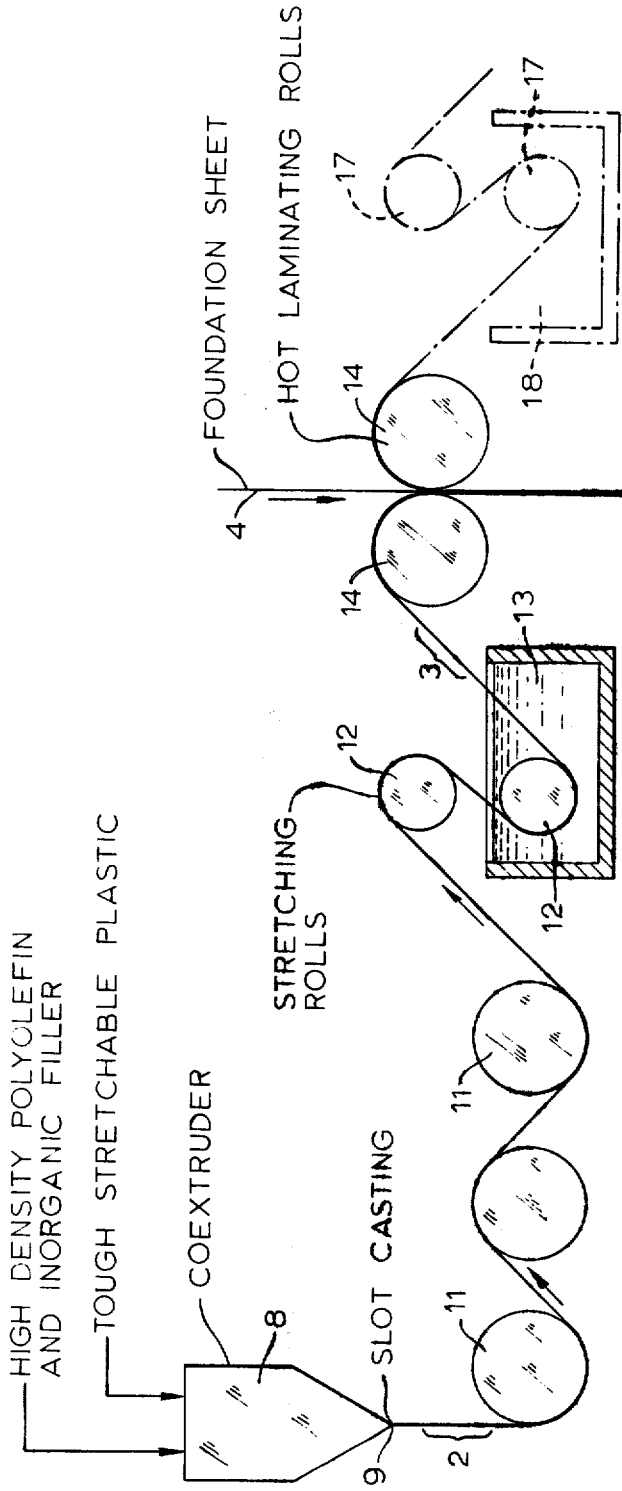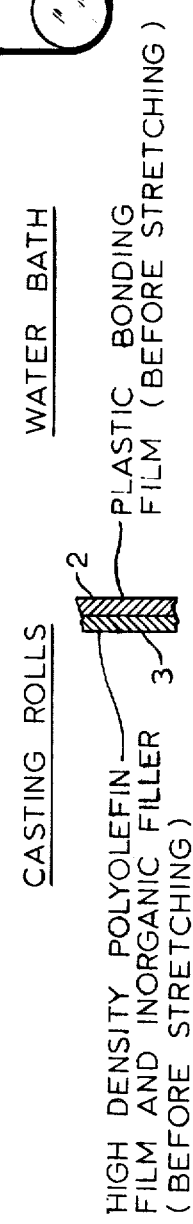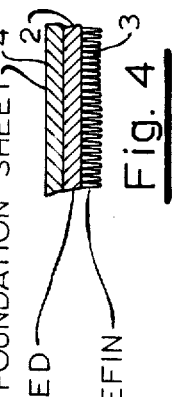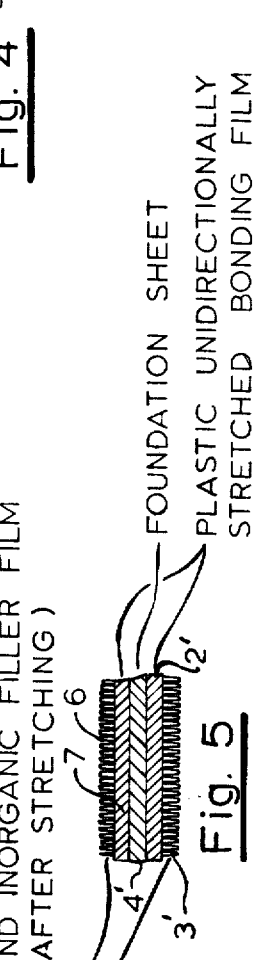

METHOD OF MANUFACTURING SYNTHETIC PAPER LAMINATES

BACKGROUND OF THE INVENTION

It is known, as is described in Canadian Pat. No. 854,685, issued Oct. 27, 1970 to Mitsubishi Petrochemical, Ltd. of Japan, to provide a synthetic paper printing surface carried by a plastic foundation or base sheet. The foundation sheet is first uniaxially stretched in the machine direction, after which a film of an inorganic filler-containing, fracturable resin is bonded to a face of the uniaxially stretched foundation sheet. At this point, the inorganic filler-containing resin on the unidirectionally stretched foundation sheet is not fractured.

Fracturing of the inorganic filler-containing film is subsequently effected by stretching it simultaneously with the foundation sheet in a transverse direction (across the machine direction). Thus, the foundation sheet becomes biaxially orientated which is known to impart strength; and the inorganic filler-containing resin film is stretched only transversely, and becomes fractured by such transverse stretching to thereby provide the printing surface. For effecting the cross-machine stretching, the use of conventional tentering or transverse drawing apparatus is utilized; and as previously explained, the tentering apparatus not only effects biaxial orientation of the foundation sheet for imparting strength, but stretches and fractures the inorganic filler-containing resin in a transverse direction.

SUMMARY AND OBJECTS OF THE INVENTION

The invention hereof obviates the use of expensive transverse stretching or tentering apparatus which is limited to lateral stretching after the inorganic resin-containing layer is bonded to the foundation sheet, and after the foundation sheet has been unidirectionally stretched in the machine direction, thus permitting the inorganic resin-containing filler layer to be stretched to best advantage because the foundation sheet of the invention hereof is bonded in the laminate after all stretching has been accomplished.

For accomplishing this purpose, the invention comprises first forming a bilaminate of a film of a thermoplastic resin made brittle and fracturable by incorporation of minute particles of an inorganic filler, which is bonded to a tough, stretchable, non-brittle, heat sealable, plastic film bonded to a face of the filler-containing film. Advantageously, the filler-containing film and the tough, heat sealable, plastic film, which serves as a bonding film and a support or carrier for the brittle film during stretching, are simultaneously extruded fron a conventional type of coextruder. However, they may be extruded separately and then bonded together by heat and pressure.

After such formation of the bilaminate and while the bilaminate is continuously traveling in one general direction (the machine direction), it is stretched, desirably in a cold water bath. This results in stretching of the bonding and carrier film for the brittle film uniaxially or unidirectionally in the machine direction together with simultaneous unidirectional stretching of the filler-containing resin film. Because at this point the bonding film is stretched in only one direction, it does not possess sufficient strength to provide a permanent support or foundation sheet.

However, it temporarily supports the filler-containing resin film until the bilaminate becomes bonded to a foundation sheet. As a result of the unidirectionally stretching, fracturing of the filler-containing film layer occurs forming microvoids between the resin and the filler to provide a printing surface as in the aforementioned Canadian patent.

To complete the laminate and impart strength thereto, a foundation sheet is bonded to a face of the bonding film by heat and pressure and while the foundation sheet and bilaminate are traveling together in the same machine direction. The foundation sheet may be any suitable material which will impart strength to and provide support for the entire laminate, for example biaxially oriented polyethylene or polystyrene, which because of the biaxial orientation has great strength, metal foil, paper, or paper board.

Thus, it is seen that a three-layer laminate is formed, one side of which is a printing surface, and the intermediate layer of which serves as a bonding layer to adhere the printing surface to one side of a foundation sheet and also serves as a carrier film for supporting the brittle film during subsequent stretching. If a printing surface is desired on the opposite side of the laminate, another bonding layer adhered to a fractured layer to provide a printing surface may be bonded to such opposite side of the foundation sheet.

From the preceeding, it is seen that the invention has as its objects, among others, the provision of an improved method for making synthetic paper wherein the necessity of utilizing transverse drawing or tentering apparatus is obviated, and which is simple and economical to perform, and to an improved product resulting from such method. Other objects of the invention will become apparent from the following more detailed description and accompanying drawings, in which:

FIG. 1 is a schematic side elevational view of conventional components employed in an apparatus for performing applicant's invention; the portion of the view at the right shown in phantom lines, schematically illustrating how a second printing surface may be formed on the aforementioned foundation sheet;

FIG. 2 is a schematic cross-sectional view of the bilaminate which is initially formed, indicated by the bracketed portion 2 in FIG. 1;

FIG. 3 is a cross-sectional view illustrating schematically the bilaminate after stretching, indicated by the bracketed portion 3 in FIG. 1;

FIG. 4 is a schematic cross-sectional view of the three-layer laminate having only one printing surface, indicated by the bracketed portion 4 in FIG. 1; and FIG. 5 is a similar view illustrating the laminate with two printing surfaces, one on each face.

DETAILED DESCRIPTION

FIG. 4 illustrates schematically in section a three-component laminate (having only one printing surface) which may be formed by the method hereof. It comprises intermediate plastic unidirectionally stretched and unfractured bonding film 2 having on one face thereof a fractured (schematically illustrated by jagged line 3) film of a thermoplastic resin containing minute particles of an inorganic filler with microvoids between the resin and the filler to provide a printing surface. The opposite face of the bonding film 2 is bonded to foundation sheet 4. The materials for and other characteristics of these three layers or films will be described hereinafter. Both the intermediate layer and the printing layer are stretched in only one direction, namely in the direction of travel of the laminate through the apparatus (known as machine direction).

FIG. 5 is a view similar to FIG. 4, illustrating printing surfaces on both faces of the laminate. Printing surface 3', bonding film 2', and foundation sheet 4' have the same relationship as in FIG. 4. Another printing surface 6 is formed on the opposite face of the laminate and is bonded to foundation sheet 4' by bonding film 7.

In the method, a bilaminate, illustrated in FIG. 2, is first formed by filler-containing film 3 bonded to bonding film 2. Both these films are of plastic resinous material to be described in greater detail later, and may be bonded together by conventional extrusion of separate layers of the resin onto a casting surface and adhering them thereon by heat and pressure. However, it is more advantageous and better results are obtained by simultaneously extruding films 2 and 3 from a conventional coextruder 8 whereby the films are merged therein and are simultaneously ejected in merged condition through extrusion slot 9, onto conventional chilled casting rolls 11. The bilaminate is ejected continuously and travels in one general direction continuously, as indicated by the direction arrows in FIG. 1.

After leaving the casting rolls 11, the two layers of bilaminate are then simultaneously stretched together in only one direction, namely the machine direction or the direction of movement of the bilaminate through the apparatus. This is effected between conventional stretching or draw rolls 12 which run at a suitable speed differential to effect the desired degree of stretching discussed hereinafter. Stretching is effected advantageously in a water bath 13 below the crystal melting point of the material, at room temperature or even lower, to compensate for heat which develops during the stretching.

The bilaminate, after stretching, is schematically illustrated in FIG. 3, which illustrates the microvoid formation at 3 on the stretched film. In this connection, it is again to be noted that both the bonding film 2 and the filler-containing resin film 3 are unidirectionally or uniaxially stretched in only one direction, namely the direction of travel through the machine or, in other words, the machine direction.

After the stretching and after the bilaminate emerges from the water bath 13, it is passed between hot laminating rolls 14 which apply heat and pressure sufficient to effect bonding of the bilaminate to foundation sheet 4 which is continuously fed into the nip between rolls 14 in engagement with bonding layer 2 of the bilaminate. Thus far, only a three-layer laminate is formed having only one printing surface 3 as shown in FIG. 4, which is removed from the laminating apparatus as it is wound on rolls or further surface polished on conventional calender rolls (not shown).

In case another printing surface is desired on the face of foundation sheet 4, opposite to printing layer 3, another bilaminate, indicated schematically by the broken lines in FIG. 1, and of the same character as the aforedescribed bilaminate, is conveyed from stretching rolls 17 through water bath 18 into the nip between calender rolls 14 wherein the bonding layer 7 thereof (FIG. 5) becomes adhered by heat and pressure to the opposite face 4' of the foundation sheet.

The temperature at which the resins are maintained in the extruder may vary widely depending on the particular resin formulation. Usually temperatures in the order of 350° to 500° F. are employed with extrusion pressures of about 4,000 to 5,000 pounds per square inch. On the casting rolls 11 the temperature is desirably in the range of 50° to 150° F., also depending on the particular resin formulations; and as previously explained, the water bath temperature may be room temperature or any other suitable temperature below the crystal melting point of the resins. Usually the temperature of the laminating rolls 14 will be between 200° and 250° F. and the heat sealing pressure between 10 and 100 pounds per square inch. These temperatures and pressures are commonly employed in the laminating art and are not critical to the instant invention.

For the paper-like printing layer, any suitable resin which when containing an inorganic filler will fracture and create voids between the resin and the filler when stretch sufficiently, may be employed for the formation of the printing surface. However, the resin should not elongate when subjected to the stretching, but should be brittle so as to fracture. Desirably and advantageously, the resin is a polyolfin such as high density polyethylene having a high melt index, or isotactic (crystalline) polypropylene. Polyethylene having a melt index about 5.0 and in the range of 12.0 to 20.0, and a density above 0.925 and preferably above 0.940 has been found most suitable. Brittleness is important because the more brittle, the weaker the film and the more numerous the voids between the resin and the filler.

As for the filler, it must be very finely divided. Suitable fillers are minute particles of clay, talc, diatomaceous earth, or any other suitable inorganic filler. Fineness of the filler is desirable because the finer, the better results. An average grain size not exceeding 35 microns is desirable. The amount of filler in the resin may vary within wide limits. A suitable range is about 10 to 65% by weight of the resin and filler, and preferably about 30 to 40%. Before extruding the resin and filler contained therein, they are thoroughly mixed together in any suitable manner.

For the bonding film, the resin should be tough and readily extensible so that it will not break or crack under the stretching as it should support the paper-like layer in the process of manufacturing the fractured laminate. Without support of this extensible carrier layer, the filled paper-like layer would break in a gross fracture instead of uniformly microfracturing over its whole surface. The fractured particles remain anchored to the bonding film and separate as the web is stretched.

A suitable resin for the bonding film is low density polyethylene having a density desirably below 0.925 and preferably between 0.915 and 0.920, and 0.5 to 5.0 melt index. Polypropylene having a density of about 0.88 to 0.91, and a melt index of 0.5 to 5.0, is also suitable as well as copolymers of ethylene with vinyl acetate, ethylacrylate, or acrylic acid. The film should be capable of stretching at least over 350% (3½ times) its length and up to 750% to obtain sufficient fracturing of the resin-containing filler layer.

The drawings are schematic and do not illustrate the relative thickness of the films. The thickness of the films may vary widely depending on the type of synthetic paper desired. For example, bonding film 2 may vary from about 0.5 mil to 2½ mils, and so may the paper-like fractured film 3. If the fractured film is too thin, it will not develop sufficient ink absorption capacity or sufficient opacity, and for this reason it should not be much below 0.5 mil. A suitable thickness is about 1 mil each, stretched to a combined thickness of about three-fourths mil as determined by the relative speed of stretching rolls 12.

As previously mentioned, the stretching is effected by conventional differential speed stretching rolls 14 in a water bath; and desirably the bonding film should be capable of stretching at least 350% without breakage so as to support temporarily the paper-like fractured film before the bilaminate is bonded to the foundation sheet. The foundation sheet may be of any suitable character as long as it will provide a support for the laminate and impart the necessary strength and stiffness required for its end use.

It may be paper, paperboard, metal foil, or biaxially oriented polyethylene, polystyrene, or polypropylene, or blown high density polyethylene, the thickness of which is governed only by the overall thickness desired and the strength requirements. A suitable thickness may vary from 2 to 200 mils. The following are examples illustrative of the invention:

Example 1

A mixture for forming the synthetic paper-like layer 3 comprised about 60% high density polyethylene having a density of 0.960 and a melt index of 15. It contained about 40% by weight of minute particles of diatomaceous earth of an average size of about 2 microns thoroughly dispersed therein. The tough stretchable plastic film 2 providing the bonding film comprised low density polyethylene having a density of about 0.920 and a melt index of about 1.4.

These two are coextruded simultaneously through a conventional coextruder 8 at a temperature of about 500° F., and a pressure of about 4,000 p.s.i., through the wide extrusion slot 9 thereof at a rate of about 25 feet per minute film travel, onto casting rolls 11 maintained at a temperature of about 100° F. The thickness of bonding film 2 was about 1.0 mil and of the paper-like film 3 about 1.0 mil, giving an overall thickness of about 2.0 mil. The resultant bilaminate was continuously drawn by differential speed stretching or draw rolls 12, the lower one with reference to FIG. 1 in water bath 13, pulling the bilaminate at about 110 feet per minute, and effecting a stretching of about 440%. The overall thickness of the bilaminate was reduced to about 1.2 mils with the individual films thereof to about 0.8 mil for fractured layer 3 and about 0.4 mil for bonding layer 2.

In hot laminating rolls 14, maintained at a temperature of about 225° F., a foundation sheet 4 of biaxially oriented polystyrene about 3 mils thick, was bonded to one side of bonding film 2 by the heat and pressure; the pressure in the nip of laminating rolls 14 being about 100 pounds per square inch.

The resultant product had an overall thickness of about 4.2 mils with printing surface thicknesses of about 0.8 mils. The printing surface contained a fine, uniform distribution of microvoids between the fractured resin and the filler which gave a white, opaque paper-like texture. Microscopic examination of subsequently inked regions showed absorption of the ink vehicle components into the fractures.

Example 2

A bilaminate having the same characteristics and material as in Example 1 was simultaneously bonded under the same conditions to the opposite side of foundation sheet 4 to produce a printing surface on each side thereof as shown in FIG. 5. The overall thickness was about 5.4 mils.

Example 3

The same materials were coextruded as in Example 1 into a 2.3 mil fractured layer and 2.0 mil bonding layer film (total thickness, about 4.3 mils). This was stretched about 500% to yield a final film of about 1.1 mil bonding layer and 1.6 mil fractured layer, total about 2.7 mils. This was laminated on one side of 7.0 mil bleached kraft paper at 100° F., 100 p.s.i. pressure, final thickness, about 8.5 mils.

Example 4

In two separate trials, high density polyethylene of about 0.960 density, and 0.2 and 0.8 melt indices, respectively, were filled as in Example 1 with about 40% by weight of diatomaceous earth of the same fineness as in Example 1 and coextruded with low density polyethylene of about 0.920 density and melt index of about 1.4. In both cases the resultant bilaminates would not uniformly elongate when stretched, as in Example 1, so that the layer containing the diatomaceous earth would break up into fine microvoids. Instead, they snapped abruptly into one large crack when stretching was attempted. This indicates that the melt index of the low density polyethylene of the filled layer should not be too low. As previously noted, the melt index should be above about 5.0, and desirably in the range of 12.0 to 20.0.

I claim:

1. The method of making a synthetic paper laminate composed of at least three layers which comprises forming a bilaminate consisting of a layer of a fracturable film of a thermoplastic resin containing minute particles of an inorganic filler and a carrier layer for said filler-containing layer of a stretchable, non-brittle, plastic, heat sealable film having one face thereof bonded to a face of the filler-containing film, while said layers are bonded together simultaneously stretching both layers of said bilaminate in only one direction while moving said bilaminate in said direction to effect fracturing of said filler-containing film and formation of microvoids between the resin thereof and the filler to thereby provide said fractured film with a printing surface, and after said simultaneous stretching of said bilaminate has been completed and while said filler-containing layer is supported by and bonded to said plastic heat sealable film effecting bonding by heat and pressure of one face of a foundation sheet to the opposite face of said plastic heat sealable film.

2. The method of claim 1 wherein the forming of the bilaminate is by simultaneously extruding the layers from a coextruder onto a casting roll.

3. The method of claim 2 wherein said stretching of the bilaminate is effected only in the machine direction, and in a water bath at room temperature or lower.

4. The method of claim 2 wherein the bilaminate is conducted from said casting roll through differential speed rolls so as to uniaxially stretch the bilaminate and then to heated laminating rolls which bond the foundation sheet to said opposite face of said plastic heat sealable film.

5. The method of claim 1 wherein the resin of the fractured film is of high density polyethylene having a density above about 0.925, a melt index above about 5.0, and a thickness of about 0.5 to 2.5 mil, and said plastic heat sealable film has a stretchability of at least about 350% without breaking.

6. The method of claim 1 wherein a second bilaminate of the same character as the bilaminate recited by said claim is formed in the same way, and the plastic heat sealable film of said second bilaminate is simultaneously bonded by heat and pressure to the opposite face of said foundation sheet.

7. The method of making a synthetic paper laminate composed of at least three layers which comprises forming a bilaminate by extruding a brittle fracturable high melt index polyolefin film containing minute particles of an inorganic filler, which film is subsequently fractured by stretching, effecting bonding thereof to a heat sealable tough stretchable plastic film to form a bilaminate composed of two layers in which said tough stretchable plastic film provides support for the fracturable film during said subsequent stretching, after said bilaminate is formed simultaneously stretching both layers thereof in only one direction while said bilaminate is continuously moved through a water bath, compensating for heat which may develop during the stretching by providing such water bath at room temperature or lower, and after said stretching has been completed effecting bonding under heat and pressure of a foundation sheet to said heat sealable layer to form at least said three layers wherein said heat sealable plastic layer is an intermediate layer.

* * * * *